United States Patent Office 2,999,891
Patented Sept. 12, 1961

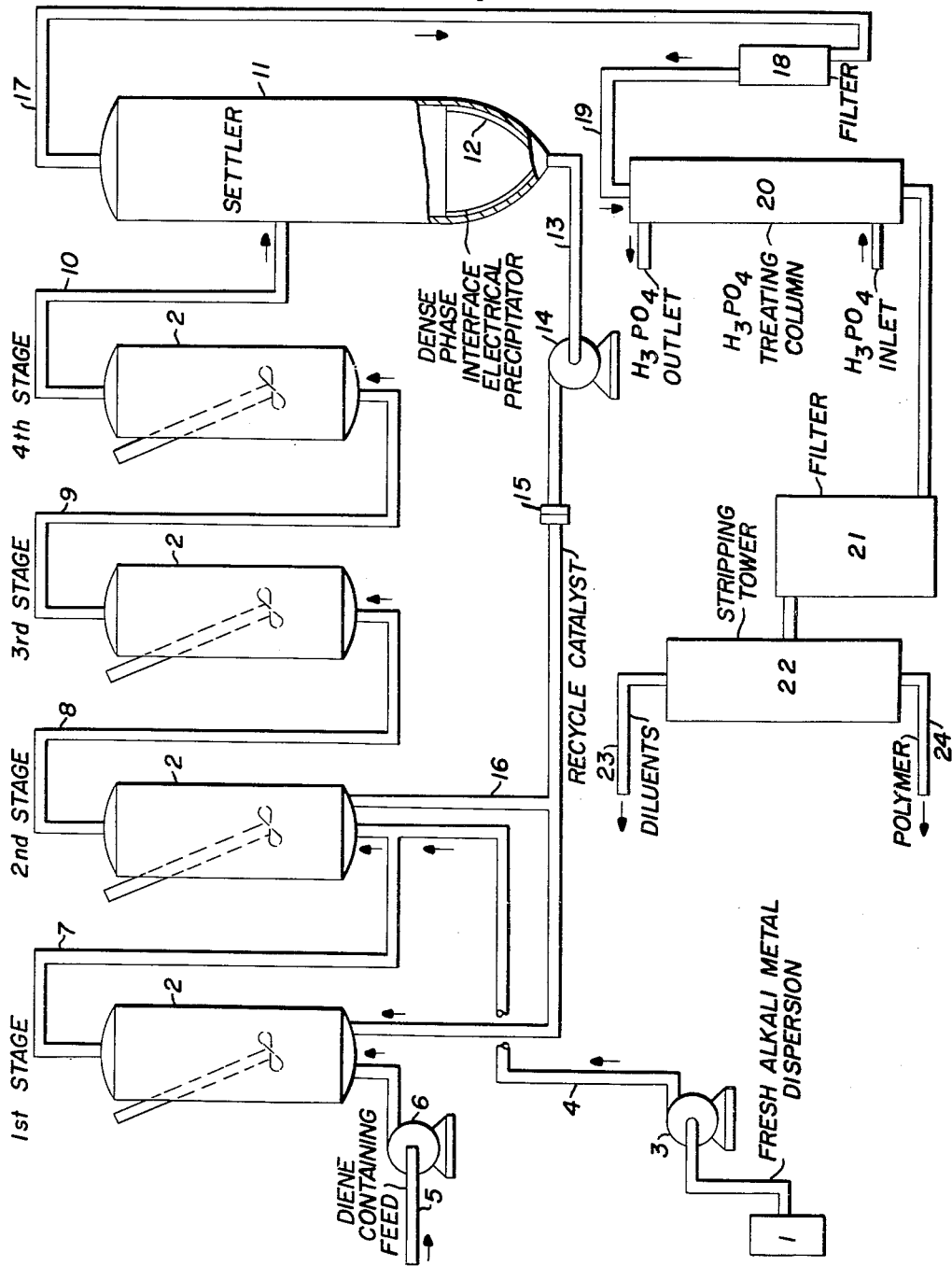

2,999,891
REMOVING ALKALI METAL CATALYSTS FROM POLYMERS
Anthony H. Gleason, Westfield, and Ober C. Slotterbeck, Rahway, N.J., assignors to Esso Research and Engineering Company, a corporation of Delaware
Filed Sept. 23, 1957, Ser. No. 685,528
12 Claims. (Cl. 260—669)

This invention relates to an improved method for the removal of catalysts and catalyst residues from polymers and more particularly relates to an improved method for treating reaction mixtures containing polymers to remove such catalytic materials as alkali metals and residues containing alkali metals, such as alkali metal alkyls, alkali metal alcoholates or other organic alkali metal-containing compounds so that the resulting polymer product is substantially free from catalyst.

The invention will be best understood from the following description wherein reference will be made to the accompanying drawing in which the single figure is a diagrammatic representation in the form of a flow plan depicting a typical process for the removal of alkali metals and alkali metal-containing residues in accordance with the present invention.

Certain types of polymerization reactions employ alkali metals as the catalyst generally activated with minor proportions of $C_1$ to $C_{12}$ alcohols. Among these reactions are copolymerizations of major proportions (up to about 100%) of $C_4$ to $C_{10}$ multiolefins (especially $C_4$ to $C_{10}$ conjugated diolefins) with or without minor proportions of mono-olefin materials containing a cyclic nucleus such as vinyl aromatic hydrocarbons. Such polymerizations or copolymerizations result in the production of polymeric oils having excellent drying properties. Particularly desirable are drying oils produced by the polymerization of about 60 to 100 weight percent, preferably about 75 to 100 weight percent of conjugated diolefins with or without a vinyl aromatic hydrocarbon comonomer in the presence of minor proportions of alkali metal catalysts such as cesium, rubidium, or preferably sodium, lithium, and/or potassium in the presence of a hydrocarbon solvent. Sodium is the most widely used alkali metal in such polymerizations. Liquid polymers or copolymers are readily produced using the catalysts hereinbefore mentioned having particle sizes of about 1 to 100 microns and preferably about 10 to 50 microns by operating at temperatures of say between about 20° and 95° C. with relatively large amounts (i.e. up to about 10.0 weight percent and preferably about 1.5 to 5.0 weight percent based on reactants) of the alkali metal catalyst preferably in the presence of an alcohol catalyst activator, a $C_4$ to $C_{10}$ hydrocarbon solvent, and certain ethers as more fully described hereinafter. There is then obtained a solution of liquid polymer or copolymer dissolved in the hydrocarbon solvent.

Upon the completion of such polymerization reactions as above mentioned, residual catalyst must be removed to prevent contamination of the oily polymerization product with alkali metal catalyst and/or reactive alkali metal organic compounds such as alkali metal alcoholates, alkali metal alkyls, or other alkali metal-containing compounds produced during polymerization.

It is know to remove alkali metal catalysts by treatment with sulfuric acid. Although, for instance, 85 percent sulfuric acid is an effective quenching agent, trace quantities of this acid invariably remain in the product causing subsequent darkening of the polymer and/or films prepared from the polymer, especially upon heating.

It has now been found that the foregoing disadvantage may be overcome and products which do not darken produced by treating the alkali metal-containing polymerization reaction mixture at a temperature level between about 20° and 95° C., preferably between about 25° and 80° C. for times between about 5 minutes and 1 hour, depending upon the degree of agitation, with a phosphoric acid or anhydride. Since the reaction with the acid is much more rapid, it is preferred to use the acid rather than the anhydride.

In accordance with the present invention, alkali metal catalyst-containing polymerization reaction mixtures are preferably treated in a preliminary separation step to remove a major proportion and preferably at least about 75 weight percent (e.g. 90 to 95 weight percent) of the metallic alkali catalyst by centrifuging, settling, filtering, and/or clay percolation or the like. The resulting solution of liquid copolymer which contains residual alkali metal alkyls, alkali metal alcoholates, or other alkali metal compounds, is then reacted, at about 20°–80° C., as more fully described hereinafter, with a phosphoric acid anhydride and/or preferably with meta, pyro, or especially ortho phosphoric acid. The amount of phosphoric acid employed is generally between about 200 and 3,000 weight percent, advantageously between about 400 and 1,000 weight percent and preferably between about 500 and 800 weight percent based on the amount of alkali metal present in the reaction mixture as hydrocarbon-soluble alkali metal compounds after the preliminary separation or separations.

Alternatively, solely the phosphoric acid treating step may be used omitting any preliminary separation step. In this case, the amount of phosphoric acid or anhydride employed will be about 3 to 10 and preferably about 5 to 8 and even more especially about 6 to 7 times the total weight of alkali metal in the feed or its equivalent. In any case, in order to effect substantially complete neutralization, the concentration of the aqueous phosphoric acid used should be above about 65%, advantageously above about 70%, and preferably about 80 to 90%.

The present invention is particularly adapted to processes for the preparation of drying oils by the polymerization of butadiene of the copolymerization of butadiene and styrene. Thus, the instant invention has specific application to the preparation of drying oils by polymerizing about 75 to 100 parts of butadiene with about 25 to 0 parts of styrene, preferably about 75 to 85 parts of the former and 25 to 15 parts of the latter. The polymerization is generally carried out at about 20° to 100° C., preferably between about 40° and 90° C., in an inert reaction diluent. As the polymerization catalyst, about 1.0 to 10 parts by weight per 100 parts of monomers of finely divided metallic sodium and/or potassium or the like is used, preferably in the presence of various polymerization modifiers which tend to promote the reaction and produce colorless products of more desirable drying rates. As an inert reaction diluent it is desirable to use $C_4$ to $C_{10}$ hydrocarbons such as a naphtha of a boiling range of between about 90 and 180° C. or straight run mineral spirits such as Varsol (boiling range 150–200° C.) or inert hydrocarbon diluents boiling between about 20° and 200° C., such as pentane, hexane, xylene, toluene, benzene, cyclohexane or the like, individually or in admixture with each other. The diluents are generally used in amounts ranging from about 50 to 500, preferably about 150 to 300 parts by weight per 100 parts by weight of monomeric materials. Various ethers having more than two carbon atoms per molecule such as diethyl ether, acetal, dioxane, t-butyl methyl ether and 1,2 dimethoxy ethane are also useful as diluents and are particularly helpful as co-diluents to insure formation of colorless products when used in amounts ranging from about 10 to 40 parts by weight per 100 parts of monomer or monomers, together with the aforesaid amounts of inert diluents such as heptane or solvent naphtha. Other means of modifying the polymer properties involve the substitution of all or part of the butadiene feed with other diolefins such as isoprene, piperylene, 2,3-dimethyl butadiene-1,3 or 2-methylpentadiene-1,3. Also, in copolymerizations, instead of styrene, various ring substituted alkyl styrenes such as p-methyl styrene, p-ethyl styrene or dimethyl styrenes may be used.

It is especially advantageous to use about 1 to 50 weight percent, preferably 10 to 20 weight percent based on the alkali metal of a $C_1$ to $C_{12}$, preferably a $C_1$ to $C_5$ aliphatic alcohol. Secondary and tertiary alcohols, particularly isopropanol or tertiary butanols are preferred. Such alcohols act as polymerization promoters by activating the catalyst. Conversions of 50 to 100% polymer (or copolymer) oil based on monomer are readily realized in batch as well as in continuous polymerizations, although the catalyst requirements are greater for continuous than for batch operations. Further details for preparing such polymer (or copolymer) oils may be found in U.S. Patent No. 2,652,342 to Anthony H. Gleason.

When treating an alkali metal-containing polymer solution with phosphoric acids or anhydrides in accordance with the present invention, the preliminary catalyst removal step (if employed) may optionally be preceded by a step in which the catalyst and polymer-containing solution is first subjected to the action of electrical precipitation to remove metal particles. The catalyst separated by electrical precipitation may be recycled to the reaction zone. Such electrical precipitation removes alkali metal, but the polymer containing reaction mixture still contains therein substantial quantities of alkali metal alcoholates, alkali metal alkyls and/or other metallo organic compounds of alkali metals. The reaction mixture may then be passed to a filtering means and subsequently to a phosphoric acid or anhydride treating zone where alkali metal alkyls and alcoholates react with the phosphoric acid or anhydride to form solid alkali metal phosphates. After the treatment with phosphoric acid, it is preferred to remove the solid phosphates by filtration, but they may be left in if the polymer is to receive further treatment.

Referring now to the drawing, a finely divided suspension of alkali metal catalyst, such as sodium, from catalyst preparation system 1, is introduced into the second stage of reaction system 2 by means of pump 3 and conduit 4. Simultaneously, a $C_4$ to $C_{10}$ diene-containing feed (e.g. butadiene), preferably with an ether type material such as dioxane, an alcohol such as isopropyl alcohol, and an inert diluent such as $C_4$ to $C_{10}$ hydrocarbons are fed into the first stage of the series reactor system 2 from line 5 through pump 6.

Reactor system 2 is shown to consist of four stages but may consist of any number of stages, preferably in excess of 1. The polymerization reaction is carried out when operating in a series system as shown so that only partial conversion of say about 30 to 40% is reached in the first stage. The reaction mixture then flows as an effluent stream from stage 1 to stage 2 through line 7 and and thence passes from stage to stage through the various connecting conduits 8 and 9. A final conversion of about 90 to 100% is obtained in the last stage. Dioxane is preferably added to the feed generally in concentrations of between about 30 to 50% based on reactants to control the reaction and to give a coloreless product. An alcohol such as isopropyl alcohol is also preferably added and when present, as beforementioned, serves as a catalyst activator. The amounts of isopropyl alcohol employed are generally between about 5 and 15 weight percent based on catalyst. The foregoing reaction mixture after polymerization in the fourth stage is withdrawn from stage 4 through line 10 and introduced into settling zone 11. Here the polymer solution is allowed to settle for a time between about 0.5 to 5.0 hours with the formation of a lower dense phase of catalyst suspension beneath clear supernatant liquid. An electrical precipitator 12 may be placed in the bottom of settler 11. The dense phase catalyst suspension may then be withdrawn from the bottom of settler 11 through line 13 and pump 14. The withdrawn suspension may then be passed through orifice 15 to redisperse the sodium catalyst-containing suspension.

The substantially clear polymer-containing reaction mixture is then withdrawn from settler 11 through overhead conduit 17 and passed through filter 18 to separate out small amounts of dispersed gel and contaminating materials if present (such as sodium carbonate, metal alkyls, sodium hydroxide, and sodium alcoholates or the like). The filtered solution is then passed via line 19 to column 20 which contains about 500 weight percent based on sodium (present as hydrocarbon-soluble compounds) of 85% orthophosphoric acid. In this column, the sodium of the sodium alcoholates and the sodium alkyls (and/or other organo-sodium compounds) reacts with the phosphoric acid replacing a hydrogen atom therefrom, forming sodium acid phosphate. The sodium or other alkali metal catalyst may then be effectively removed from the system. After the polymer solution is contacted with the phosphoric acid or anhydride in acid treating column 20, it is advantageously passed through filter 21 and stripped in stripping tower 22 to the desired concentration for subsequent operations. Ethers and alcohols are removed overhead through line 23, the ethers and alcohols being subsequently separated out (not shown) and recycled to the process. The polymer or copolymer, which is then substantially free of alkali metals and alkali metal compounds, is withdrawn through line 24 to storage.

In order to more fully illustrate the present invention the following experimental data is given. It is to be expressly understood that the data presented is for purposes of illustration only and not with the intention of limiting the present invention.

*Example*

A two liter stainless steel reactor was charged with 80 grams (i.e. 80 parts by weight) of butadiene,1=3; 20 grams (i.e. 20 parts by weight) of styrene; 400 ml. (i.e. 320 parts by weight) of straight run mineral spirits having a boiling range of 150° to 200° C.; 20 parts of dioxane,1=4; 1.5 parts of finely divided sodium; and 0.2 part of isopropyl alcohol. The reaction mixture was heated with agitation at 50° C. for 8 hours whereby substantially complete conversion (e.g. 98%) of monomer was obtained. A portion of the crude polymer reaction mixture was filtered through fluted paper to give a water-white product. A drop of phenolphthalein solution added to the filtered polymer solution gave a red color indicating residual alkalinity. One hundred ml. of the filtered solution were then shaken with 0.5 ml. of 85% phosphoric acid. The mixture was filtered to remove sodium acid phosphate and then tested again with phenolphthalein. The test this time showed no residual alkalinity. Subsequent aging of the resulting polymer product showed that no darkening of the polymer occurred. Varnish films heated at temperatures of 150° C. to cure the same, were also found to be light in color with no darkening of the polymer-containing film, whereas treatment with 85% sulfuric acid instead of phosphoric acid resulted in films which, when cured at the above temperature, darkened appreciably.

Resort may be had to modifications and variations of the disclosed embodiments without departing from the spirit of the invention or the scope of the appended claims.

What is claimed is:

1. In a process for treating a polymer reaction mixture which has been produced by the polymerization of a $C_4$ to $C_{10}$ multiolefin in the presence of an alkali metal catalyst, the improvement which comprises contacting spent alkali metal catalyst and polymer-containing reaction mixture formed at a temperature level of between about 20° and 95° C. with a composition consisting of a member selected from the group consisting of phosphoric acids, phosphoric anhydrides and mixtures thereof until alkali metal containing impurities are destroyed.

2. A process according to claim 1 in which the polymer-containing reaction mixture is first treated to remove free alkali metal and insoluble alkali metal-containing compounds and then contacted with a member selected from the group consisting of phosphoric acids, phosphoric anhydrides and mixtures thereof.

3. A process according to claim 2 in which the free alkali metal and insoluble alkali metal compounds are removed by clay percolation.

4. A process according to claim 2 in which the free alkali metal and insoluble alkali metal compounds are removed by filtration.

5. A process for preparing a substantially alkali metal free liquid polymer solution which comprises polymerizing in a polymerization zone a reaction mixture containing monomers comprising about 80 to 100 weight percent of a $C_4$ to $C_{10}$ conjugated diolefin and about 0 to 20 weight percent of a vinyl aromatic hydrocarbon in the presence of a finely divided alkali metal catalyst and an inert diluent, whereby a polymer-containing reaction mixture containing finely divided free alkali metal and insoluble alkali metal-containing compounds is formed, separating out about 0–100% of the free alkali metal and insoluble alkali metal-containing compounds from the reaction mixture and contacting the resulting mixture containing residual alkali metal and alkali metal compounds at a temperature level between about 20° and 80° C. with a composition consisting of about 200 to 2,000 weight percent based on total alkali metal of a phosphorus-containing compound selected from the group consisting of phosphoric acids, phosphoric anhydrides and mixtures thereof until substantially all of the alkali metal-containing compounds are converted to alkali metal phosphates, and filtering off said alkali metal phosphates.

6. A process according to claim 5 in which the diolefin is butadiene, the vinyl aromatic hydrocarbon being styrene.

7. A process according to claim 5 in which the inert diluent comprises $C_4$ to $C_{10}$ hydrocarbons.

8. A process according to claim 5 in which the polymerization is conducted in the presence of an inert diluent and a member selected from the group consisting of alcohols, ethers, and mixtures thereof.

9. A process according to claim 5 in which the phosphorus-containing compound is a phosphoric acid.

10. A process according to claim 5 in which the phosphorus-containing compound is a phosphoric acid anhydride.

11. A process according to claim 5 in which the phosphorus-containing compound is aqueous orthophosphoric acid.

12. A process according to claim 5 in which the alkali metal is a member selected from the group consisting of sodium, potassium, lithium, and mixtures thereof.

References Cited in the file of this patent
UNITED STATES PATENTS
2,813,136    Mertz _____ Nov. 12, 1957